US012633149B2

(12) United States Patent
Ponnuru et al.

(10) Patent No.: US 12,633,149 B2
(45) Date of Patent: May 19, 2026

(54) GENERATION OF DOMAIN-SPECIFIC IMAGES FOR TRAINING OPTICAL CHARACTER RECOGNITION (OCR) MACHINE LEARNING MODEL

(71) Applicant: OPEN TEXT INC., Wilmington, DE (US)

(72) Inventors: Saikrishna Prabhu Ponnuru, Telangana (IN); Jaya Lakshmi Navya Yadlapalli, Telangana (IN)

(73) Assignee: Micro Focus LLC, Wilmington, DE (US)

( * ) Notice: Subject to any disclaimer, the term of this patent is extended or adjusted under 35 U.S.C. 154(b) by 286 days.

(21) Appl. No.: 18/476,881

(22) Filed: Sep. 28, 2023

(65) Prior Publication Data

US 2025/0111689 A1 Apr. 3, 2025

(51) Int. Cl.
*G06V 30/19* (2022.01)
*G06V 10/764* (2022.01)

(52) U.S. Cl.
CPC ...... *G06V 30/19173* (2022.01); *G06V 10/764* (2022.01)

(58) Field of Classification Search
CPC ................. G06V 10/764; G06V 30/10; G06V 30/19173; G06V 30/19147
See application file for complete search history.

(56) References Cited

U.S. PATENT DOCUMENTS

| | | | | |
|---|---|---|---|---|
| 10,489,682 | B1 * | 11/2019 | Kumar | G06N 3/084 |
| 11,003,937 | B2 * | 5/2021 | Uppal | G06V 30/1463 |
| 11,201,892 | B1 * | 12/2021 | Kashitsyn | H04L 63/1433 |
| 2015/0278188 | A1 * | 10/2015 | Aras | G06F 40/211 709/245 |
| 2019/0213252 | A1 * | 7/2019 | Simard | G06F 40/30 |
| 2019/0364011 | A1 * | 11/2019 | Nguyen | G06F 16/9535 |
| 2020/0004815 | A1 * | 1/2020 | Weisberg | G06N 5/046 |
| 2022/0035519 | A1 * | 2/2022 | Rathod | G06F 3/0481 |
| 2022/0159032 | A1 * | 5/2022 | John | H04L 63/10 |
| 2025/0085700 | A1 * | 3/2025 | Carrara | G05B 19/41885 |

* cited by examiner

*Primary Examiner* — Shaghayegh Azima
(74) *Attorney, Agent, or Firm* — Sheridan Ross P.C.

(57) ABSTRACT

Domain-specific images used for training an optical character recognition (OCR) machine learning model are generated as follows. Universal resource locator (URL) addresses of web pages associated with a particular domain are retrieved. Words in the web pages associated with the particular domain are determined. Domain-relevant n-grams of the words are identified for the particular domain. Corresponding domain-specific images of each domain-relevant n gram for the particular domain are generated.

19 Claims, 8 Drawing Sheets

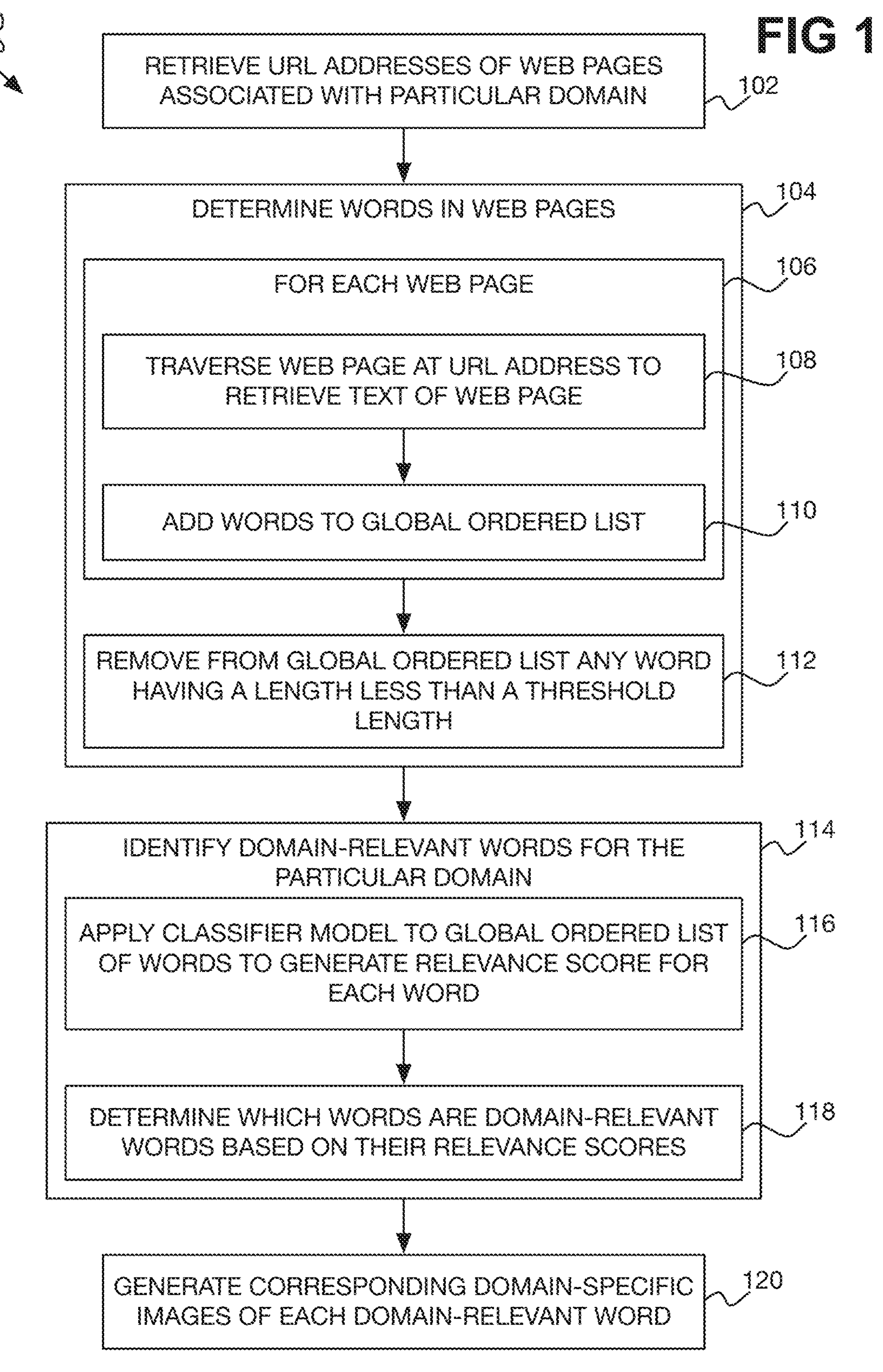
FIG 1
100
RETRIEVE URL ADDRESSES OF WEB PAGES ASSOCIATED WITH PARTICULAR DOMAIN
102
DETERMINE WORDS IN WEB PAGES
104
FOR EACH WEB PAGE
106
TRAVERSE WEB PAGE AT URL ADDRESS TO RETRIEVE TEXT OF WEB PAGE
108
ADD WORDS TO GLOBAL ORDERED LIST
110
REMOVE FROM GLOBAL ORDERED LIST ANY WORD HAVING A LENGTH LESS THAN A THRESHOLD LENGTH
112
IDENTIFY DOMAIN-RELEVANT WORDS FOR THE PARTICULAR DOMAIN
114
APPLY CLASSIFIER MODEL TO GLOBAL ORDERED LIST OF WORDS TO GENERATE RELEVANCE SCORE FOR EACH WORD
116
DETERMINE WHICH WORDS ARE DOMAIN-RELEVANT WORDS BASED ON THEIR RELEVANCE SCORES
118
GENERATE CORRESPONDING DOMAIN-SPECIFIC IMAGES OF EACH DOMAIN-RELEVANT WORD
120

300
OCR ML MODEL-GENERATING SYSTEM
302
OCR ML MODEL
322
314
318
PARTICULAR DOMAIN
316
NETWORK 306
DOMAIN-SPECIFIC IMAGES
320
GROUND TRUTH FILE
324
MAPPING FILE
326
DOMAIN-SPECIFIC IMAGE-GENERATING SYSTEM
304
DATABASE
308
DOMAIN
310
URL
312
DOMAIN
URL
DOMAIN
URL

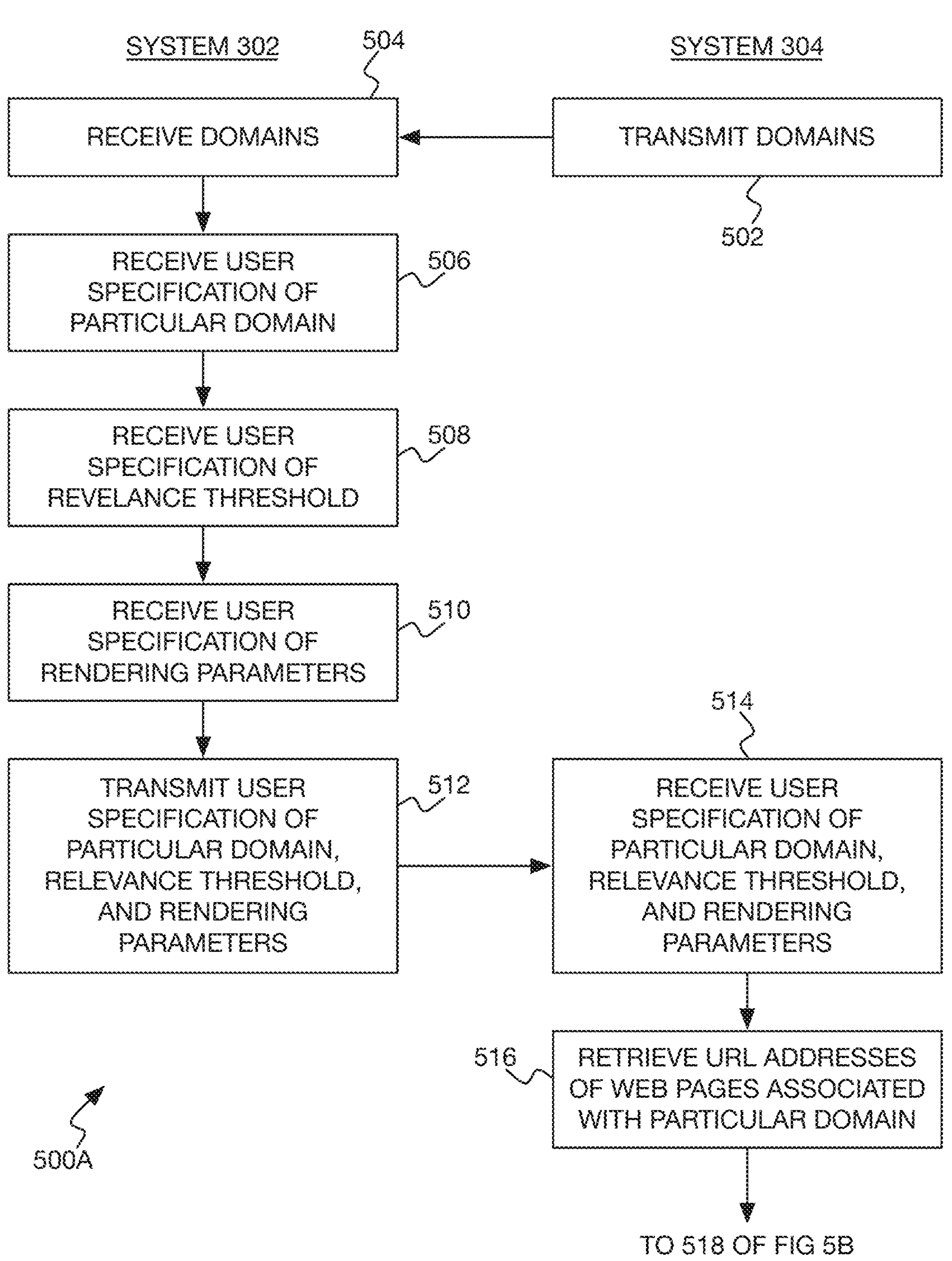
FIG 5A
SYSTEM 302
SYSTEM 304
504
RECEIVE DOMAINS
TRANSMIT DOMAINS
502
RECEIVE USER SPECIFICATION OF PARTICULAR DOMAIN
506
RECEIVE USER SPECIFICATION OF REVELANCE THRESHOLD
508
RECEIVE USER SPECIFICATION OF RENDERING PARAMETERS
510
514
TRANSMIT USER SPECIFICATION OF PARTICULAR DOMAIN, RELEVANCE THRESHOLD, AND RENDERING PARAMETERS
512
RECEIVE USER SPECIFICATION OF PARTICULAR DOMAIN, RELEVANCE THRESHOLD, AND RENDERING PARAMETERS
516
RETRIEVE URL ADDRESSES OF WEB PAGES ASSOCIATED WITH PARTICULAR DOMAIN
500A
TO 518 OF FIG 5B

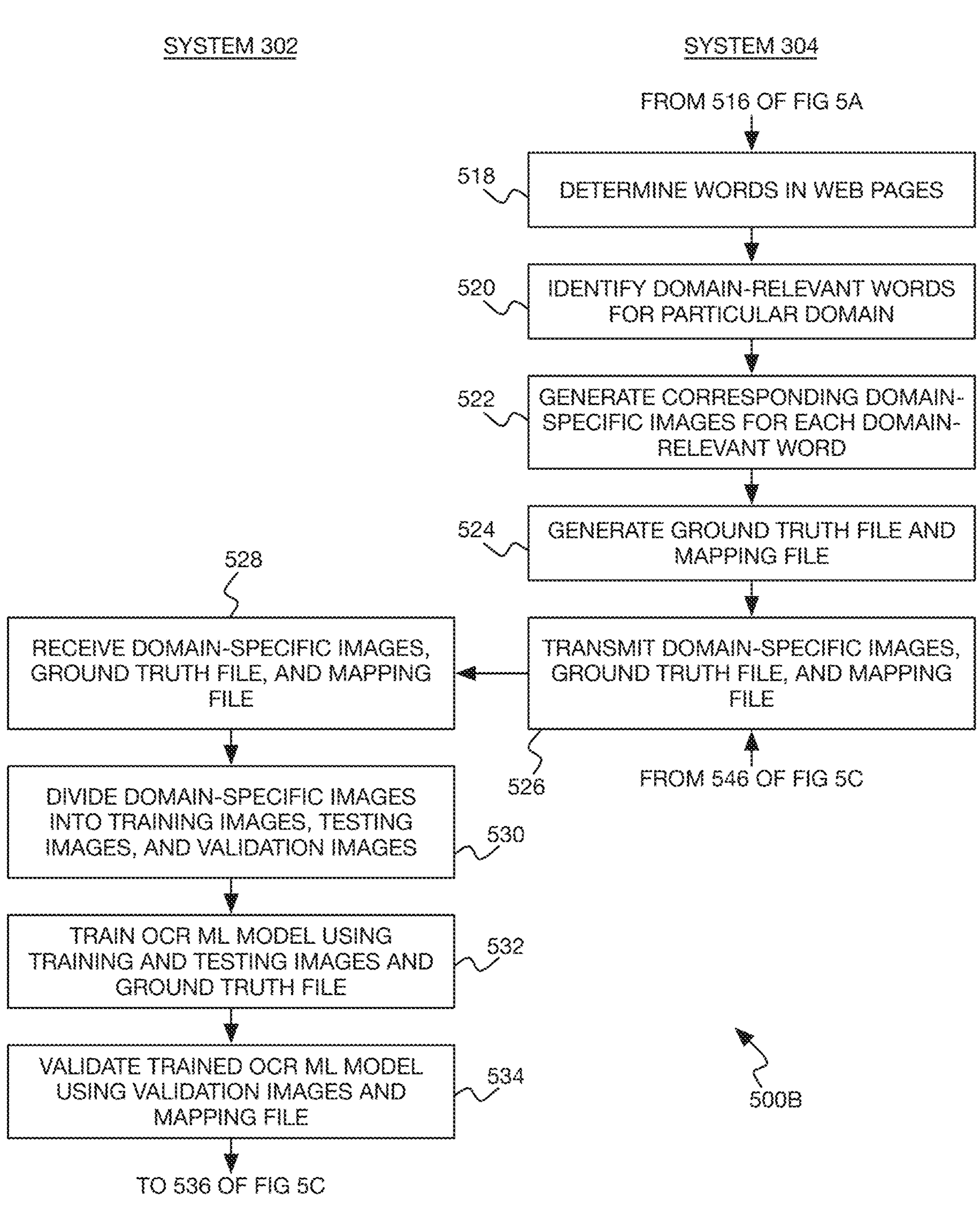
FIG 5B
SYSTEM 302
SYSTEM 304
FROM 516 OF FIG 5A
518
DETERMINE WORDS IN WEB PAGES
520
IDENTIFY DOMAIN-RELEVANT WORDS FOR PARTICULAR DOMAIN
522
GENERATE CORRESPONDING DOMAIN-SPECIFIC IMAGES FOR EACH DOMAIN-RELEVANT WORD
524
GENERATE GROUND TRUTH FILE AND MAPPING FILE
528
RECEIVE DOMAIN-SPECIFIC IMAGES, GROUND TRUTH FILE, AND MAPPING FILE
TRANSMIT DOMAIN-SPECIFIC IMAGES, GROUND TRUTH FILE, AND MAPPING FILE
526
FROM 546 OF FIG 5C
DIVIDE DOMAIN-SPECIFIC IMAGES INTO TRAINING IMAGES, TESTING IMAGES, AND VALIDATION IMAGES
530
TRAIN OCR ML MODEL USING TRAINING AND TESTING IMAGES AND GROUND TRUTH FILE
532
VALIDATE TRAINED OCR ML MODEL USING VALIDATION IMAGES AND MAPPING FILE
534
500B
TO 536 OF FIG 5C

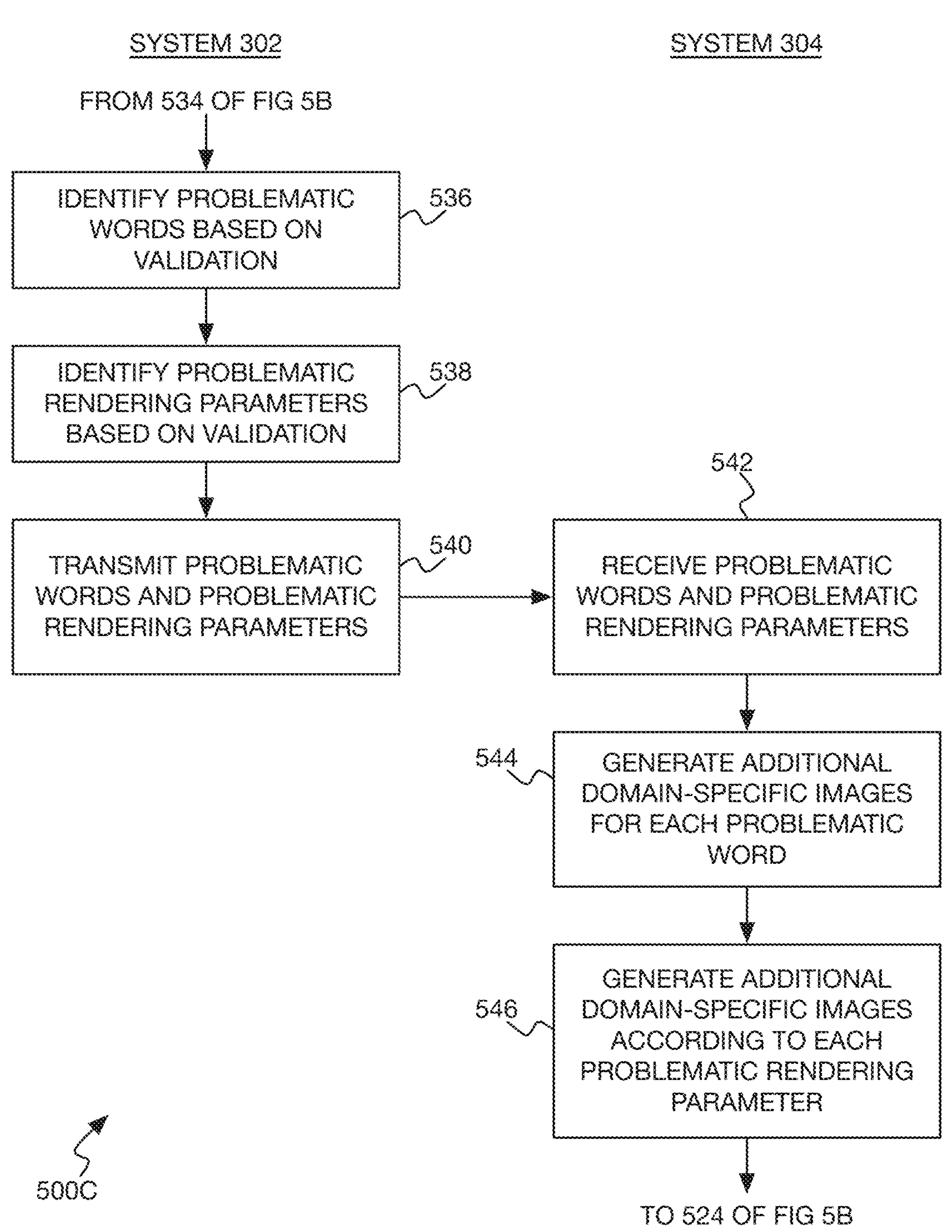
FIG 5C
SYSTEM 302
SYSTEM 304
FROM 534 OF FIG 5B
IDENTIFY PROBLEMATIC WORDS BASED ON VALIDATION
536
IDENTIFY PROBLEMATIC RENDERING PARAMETERS BASED ON VALIDATION
538
542
TRANSMIT PROBLEMATIC WORDS AND PROBLEMATIC RENDERING PARAMETERS
540
RECEIVE PROBLEMATIC WORDS AND PROBLEMATIC RENDERING PARAMETERS
544
GENERATE ADDITIONAL DOMAIN-SPECIFIC IMAGES FOR EACH PROBLEMATIC WORD
546
GENERATE ADDITIONAL DOMAIN-SPECIFIC IMAGES ACCORDING TO EACH PROBLEMATIC RENDERING PARAMETER
500C
TO 524 OF FIG 5B

GENERATION OF DOMAIN-SPECIFIC IMAGES FOR TRAINING OPTICAL CHARACTER RECOGNITION (OCR) MACHINE LEARNING MODEL

BACKGROUND

Text is frequently electronically received in a non-textually editable form. For instance, data representing an image of text may be received. The data may have been generated by scanning a hardcopy of the image using a scanning device, by capturing the image using a smartphone or other computing device having a camera or other type of image-capturing sensor, or in another manner. The text is not textually editable, because the data represents an image of the text as opposed to representing the text itself in a textually editable and non-image form, and thus cannot be edited using a word processing computer program, a text editing computer program, and so on. To convert the data to a textually editable and non-image form, optical character recognition (OCR) may be performed on the image to generate data representing the text in a textually editable and non-image form, so that the data can be edited using a word processing computer program, a texting editing computer program, and so on.

BRIEF DESCRIPTION OF THE DRAWINGS

FIG. 1 is a flowchart of an example method for generating domain-specific images for training an optical character recognition (OCR) machine learning model.

FIGS. 5A, 5B, and 5C are flowcharts of an example method for generating domain-specific images and for training and validating an OCR machine learning model within the environment of FIG. 3.

DETAILED DESCRIPTION

Figure 2A:
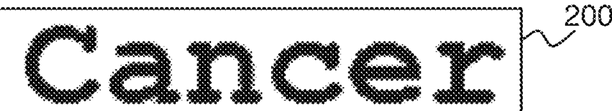
FIGS. 2A and 2B are diagrams of example representations of images that can be generated using the method of FIG. 1.

As noted in the background section, data can represent an image of text, as opposed to representing the text itself in a textually editable and non-image form that can be edited using a word processing computer program, a text editing computer program, and so on. To convert the data to a textually editable and non-image form, optical character recognition (OCR) may be performed on the image. Performing OCR on the image generates data representing the text in a textually editable and non-image form, so that the data can be edited using a computer program like a word processing computer program or a text editing computer program.

A machine learning model may be used to perform OCR on an image of text to convert the data into a textually editable and non-image form. The machine learning model may be a supervised machine learning model, which means that the machine learning model first has to be trained before the model can be used to actually perform OCR. Such a machine learning model is trained on large amounts of training data in the form of images of text that are labeled. That is, the training data includes a large number of images of text, where each image is accompanied by the word or words that appear in the image.

Although such OCR machine learning models may on average have good accuracy, their accuracy can suffer for images of text in specialized domains, which can be defined as specified areas of knowledge such as medicine, engineering, law, and so on. This can be because text particular to a given domain can frequently include domain-specific words that are uncommon and that may not have appeared in the training data on which an OCR machine learning model was trained. The failure of an OCR machine learning model to recognize such words may not be an issue for general-purpose text in which the words appear infrequently or not at all, but can become an issue for domain-specific text in which the words may appear often.

One way to improve the accuracy of an OCR machine learning model for a particular domain is to train the model on training data specific to the domain. For example, the training data can include labeled images of words that often appear in text in that domain. However, obtaining such training data can be difficult. Readily available corpuses of OCR training data, for instance, usually include labeled images of words appearing in more general-purpose text and in text in multiple domains, without regards to any specific domain.

Furthermore, while OCR machine learning models may on average have good accuracy, their accuracy may suffer for certain types of images of text. For example, an OCR machine learning model may have been trained on scanned images of printed documents that were computer-generated, such as scanned images of word processing documents printed on white office paper, and so on. Such an OCR machine learning model will likely have reduced accuracy for images of text handwritten on ruled notepad paper, particularly when such handwritten text is in cursive form as opposed to in block letter form.

Techniques described herein ameliorate these and other issues. The techniques provide for a way to generate domain-specific images for training an OCR machine learning model. An image is specific to a domain in that it is an image of a word or words that are more likely to be encountered in text in that domain than in more general-purpose text. The machine learning model will likely have improved accuracy for images of text in the domain in question, since the model will have been trained on images of words or words that are more likely to appear in such text.

The techniques described herein can further generate training images so that they correspond to the images of text on which the OCR machine learning model is expected to be used. For example, if the model is anticipated to be used on images of text handwritten on ruled notepad paper, the training images can be generated to approximate or simulate such handwritten text against a background of ruled notepad paper. The machine model will therefore likely have improved accuracy, since the model will have been trained on the same types of images.

FIG. 1 shows an example method 100 for generating domain-specific images that can be used for training and/or validation of an OCR machine learning model. The method 100 can be implemented as program code stored on a non-transitory computer-readable data storage medium and executed by a processor of a computing device to perform processing. The data storage medium may be a volatile storage medium such as a semiconductor medium like a dynamic random-access memory (DRAM), or may be a non-volatile storage medium such as a solid-state drive (SSD), a flash memory, a hard-disk drive (HDD), and so on.

The method 100 includes retrieving universal resource locator (URL) addresses of web pages associated with a particular domain for which domain-specific images are to be generated (102). The web pages may be publicly accessible over the Internet, for instance. An entity, such as an enterprise, corporation, or other organization, may maintain a curated list of web pages, by their URL addresses, for each of a number of different specific domains. The entity may periodically update the web pages for a given domain by adding the URLs of new web pages associated with that domain or by removing the URLs of previously added web pages.

An end user who is initiating performance of the method 100 to generate domain-specific images for a particular domain to train and/or validate an OCR machine learning model may also augment the curated list of web pages that the entity maintains for that domain. The end user may or may not belong to the entity that maintains the list of web pages. As an example of the former, the end user may be an employee of the entity, and as an example of the latter, the end user may be a customer of the entity (or belong to a different entity that is the customer).

The method 100 includes determining the words in the web pages (104). This process can be referred to as web scraping, which involves fetching a web page and extracting data (such as the text thereof) from the web page. In one implementation, the words in the web pages can be determined as follows for each web page for which a URL address has been retrieved (106). First, the web page at the URL address is traversed to retrieve the text of the web page (108). Other, non-textual parts of the web page, such as images, video, and so on, are not retrieved.

The text of a web page that is retrieved may just be the text that is displayed when the web page is accessed via a web browser program. Other text of the web page, such as that forming the markup language portions of the web page and which is otherwise not displayed when accessed using a web browser computer program, may not be retrieved. As a rudimentary example, a web page formatted in the hypertext markup language (HTML) may include the text "<strong>widget</strong>" to instruct a web browser to render and display the word "widget" in a bolded manner. Therefore, while the word "widget" is displayed, the word "strong" is not, such that the former but not the latter is retrieved.

Second, the words of the retrieved text of the web page are added to a global ordered list of words (110). The list of words is global in that it is not specific to a given web page, and the words of each web page that is traversed are added to the same list. The list of words is ordered by the order in which the web pages are traversed to add their words to the list. The words of each web page are ordered in the list in the order in which they appear on that web page.

The words of a web page include each string of one or more alphabetic characters between delimited by a pair of spaces in the web page's retrieved text. The words of a web page further can include the first string of one or more alphabetic characters preceding the first space in the retrieved text. Similarly, the words of a web page can include the last string of one or more alphabetic characters following the last space in the retrieved text.

The words of a web page may in one implementation be added to the global list of words without any accompanying punctuation or symbols in the text of the web page. For example, the string "(hello)" may be added as the word "hello" to the global list. Similarly, strings completely consisting of numbers may not be added, and numbers may be removed from strings when that also include letters when the strings are added. For example, the string "555" may not be added as a word to the global list, whereas the string "5-fold" may be added as the word "fold" the global list, without the number "5" and the punctuation "-". In another implementation, non-alphabetic characters, such as numbers, punctuation, and other special characters may be included in words, such that such characters are not removed when added to the global list. The words may also be added in one implementation to the list without respect to their case, such that the words "Hello" and "HELLO" are each added to the global list as the word "hello". In another implementation, words may be added in a case-sensitive manner, such that "Hello" and "HELLO" are added as two different words.

As an example of the process that is performed in (108) and (110), there may be three web pages that are traversed to retrieve their text and add words thereof to the global list. The first web page may have the text "The quick brown fox jumps over the fence." The words "the", "quick", "brown", "fox", jumps ", "over", "the", and "fence" are added, in that order, to the global list, and are the first words in the global list. The second web page may have the text "5 Arctic foxes run on a plateau." The words "arctic", "foxes", "run", "on", "a", "plateau" are added, in that order, to the list, after the word "fence". The third web page may have the text "Gray foxes have increased by a factor of 3-fold." The words "gray", "foxes", "have", "increased", "by", "a", "factor", "of", "fold" are added, in that order, to the list, after the word "plateau".

Once the global list of words of the web pages associated with the particular domain has been assembled, any word having a length less than a threshold length may be removed from the list (112). For example, words that are less than three letters in length may be removed from the list. Therefore, words such as "I", "an", "a", "in", and so on, are removed from the list. Such words may be removed from the global list as being unlikely to be domain-relevant words, as opposed to being more general-purpose words that are not specific or relevant to the particular domain in question.

The method 100 includes identifying which of the words of the web pages associated with the particular domain are domain-relevant words for that particular domain (114). A word is considered as being relevant to the particular domain if the word is specific or related to the specified area of knowledge that is the domain, as opposed to being a more general-purpose word or unrelated to the area of knowledge. More generally, domain-relevant n-grams of the words of the web pages may be determined, where an n-gram is a sequence of n of the words. In the case in which n=1, the n-grams that are identified are each one of the words of the web pages.

In one implementation, the domain-relevant words for the particular domain may be identified as follows. A classifier model may be applied to the global ordered list of words that has been assembled to generate a relevance score for each word (116). That is, more generally, the global ordered list of words is provided as input to the classifier model. The model in response provides as output a list of n-grams that are each made up of n of the words, along with a relevance score for each n-gram. An example of such a classifier model that can be used is one that employs the KeyBERT technique, which leverages a Bidirectional Encoder Representation and Transformers (BERT) language model, and is available at maartengr.github.io/KeyBERT.

The relevance score for a word (or more generally, n-gram) is an indication of the relevance of that word to the global ordered list of words as a whole, and thus to the words of the web pages associated with the particular domain. To the extent that the words of the web pages are representative of the particular domain, the relevance score for a word therefore indicates how relevant that word is to the particular domain. The relevance score for a word may be a value between 0 and 1, where 0 denotes that the word has minimum relevance and 1 denotes that the word has maximum relevance.

In the case in which the classifier model provides relevance scores for individual words (i.e., for n-grams in the case in which n=1), the model may output a relevance score for each word within the global ordered list of words. In the case in which the classifier model provides relevance scores for word sequences (i.e., for n-grams in the case in which n>1, or in which n is a range between p and q where q>p>1), the classifier model may be provided with a parameter governing the number of n-grams that are output. The parameter may be the minimum relevance score that every output n-gram may have to have, for instance.

Once the relevance scores have been generated using the classifier model, which of the words (or generated n-grams more generally) are domain-relevant words for the particular domain is determined based on their relevance scores (118). A relevance threshold may be employed in this respect. For example, the relevance threshold may specify a percentage or absolute number. In this case, the specified percentage or absolute number of the words for which the relevance score is the highest may be selected as those which are domain-relevant for the particular domain.

The method 100 includes generating corresponding domain-specific images for each domain-relevant word (or, more generally, domain-specific n-gram) that has been identified for the particular domain (120). There may be multiple rendering parameters that control image generation, such as font, background, and filter parameters. The font parameter specifies one or more fonts by font type, font style, and/or font size. The background parameter specifies one or more image backgrounds. The filter parameter specifies one or more filters. For each domain-relevant word (i.e., n-gram), a domain-specific image corresponding to each unique combination of one of the specified fonts, one of the image backgrounds, and one of the filters is generated.

For example, the font parameter may specify two different handwriting-oriented fonts, in three font styles (plain, bold, and italicized), and in three font sizes (8, 12, and 24-point). There are therefore 2×3×3=18 different font-style-size combinations. The background parameter may specify two image backgrounds: a plain white image and a ruled notebook image. The filter parameter may specify two filters: no filter and a blur filter that when applied blurs an image. In this example, there are therefore 18×2×2=72 different font-background-filter combinations, such that 72 different images are generated for each domain-relevant word.

Figure 2B:

FIGS. 2A and 2B show two example images 200 and 250 that are representative of domain-specific images that may be generated for the domain-relevant word "cancer" and "medicine," respectively. The words are rendered in the images 200 and 250 with different fonts and font sizes. The word "cancer" is rendered in the image 200 against a plain white background, whereas the word "medicine" is rendered in the image 250 against a gray background.

The described method 100 provides for a way to easily generate large numbers of domain-specific images for a particular domain that can then be used to train and validate an OCR machine learning model. The resultantly trained and validated OCR machine learning model will likely have improved accuracy when applied to images of text in the particular domain as compared to if it were trained and validated with training images that were not domain specific. Even a relatively small number of web pages that are associated with a particular domain can result in a relatively large number of domain-relevant words, and an even larger number of domain-specific images (since multiple images are generated for each word).

The images can further be generated for the types of images to which the resultantly trained OCR machine learning model is likely to be applied. For example, if the OCR machine learning model is expected to be used to transcribe smartphone-captured images of handwritten text on ruled notebook pads, domain-specific images may be generated using handwriting-oriented fonts and background images of different types of ruled notebook pads. Filters may be chosen to correspond to typical smartphone image capture conditions, such as low light conditions, and so on. The images are thus not only of words that are likely to appear in text of the particular domain, but also approximate expected captured images of such text.

Figure 3:
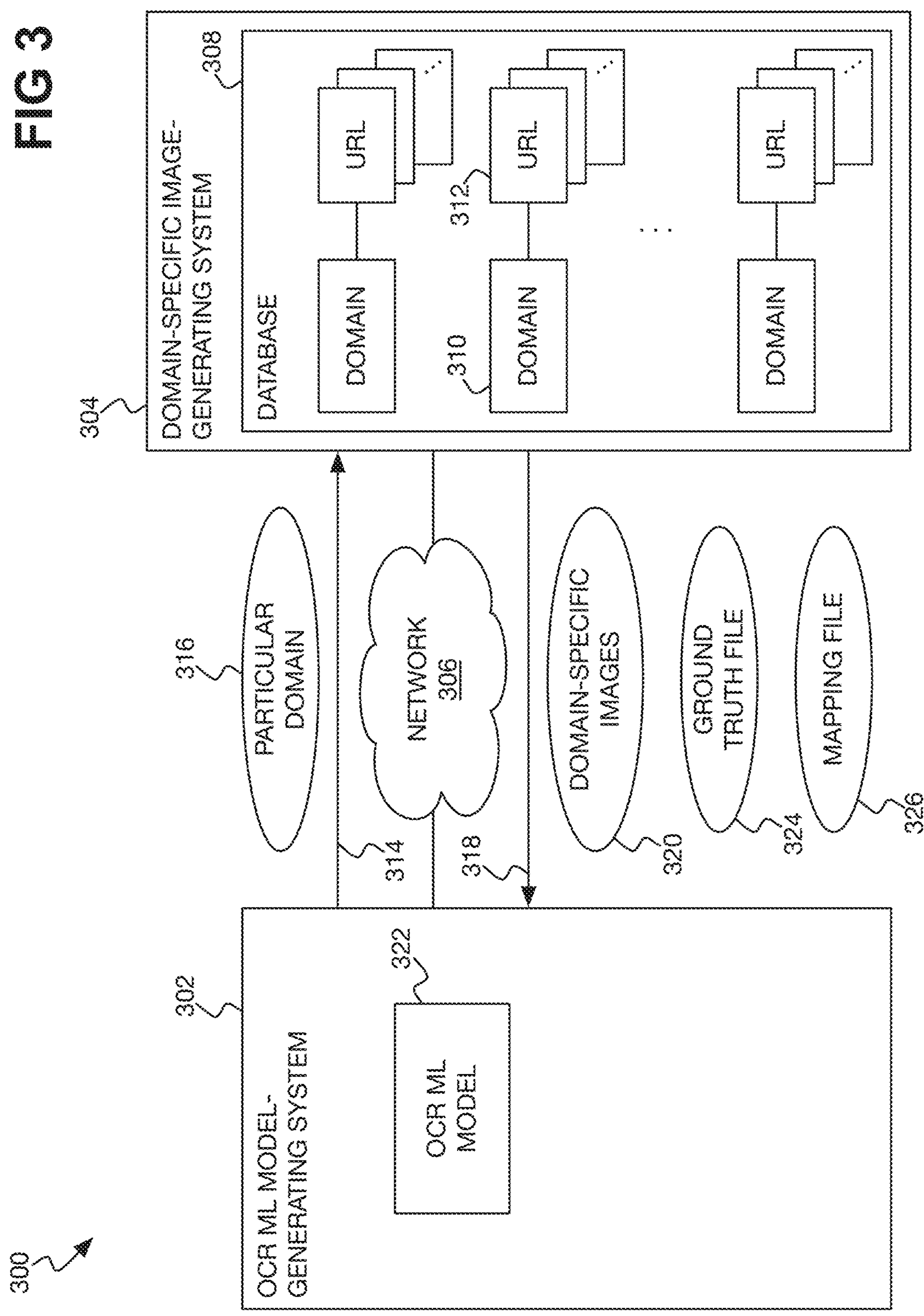
FIG. 3 is a diagram of an example environment in which a domain-specific image-generating system can generate domain-specific images for an OCR machine learning model-generating system to train and validate an OCR machine learning model.

FIG. 3 shows an example environment 300 in relation to which the method 100 can be implemented. The environment 300 includes an OCR machine learning model-generating system 302 and a domain-specific image-generating system 304 that are communicatively connected to one another over a network 306. Each of the systems 302 and 304 may include one or multiple computing devices, such as desktop, laptop, notebook, or server computers. The network 306 may be or include the Internet. It is also noted that the systems 302 and 304 may be implemented as a single system, such as a single computing device.

The system 304 stores a database 308 that includes, for each of a number of domains 310, URL addresses 312 for web pages associated with that domain 310. Per arrow 314, the system 302 provides specification of a particular domain 316 as input to the system 304, which then retrieves the URL addresses 312 of web pages for the particular domain 316 from the database 308. The system 304 generates domain-specific images 320 for the particular domain 316 in accordance with the method 100, and returns the images 320 to the system 302 over the network 306, per arrow 318. The images 320 may be in the form of individual image files, such as JPG, PNG, or other types of image files. The system 302 can therefore train and validate an OCR machine learning model 322 based on the images 320 to tailor the model 322 to the domain 316.

The system 304 may be operated by an entity, such as an enterprise or other organization. The system 304 may provide a web service, such as in the form of an application programming interface (API), over the network 306 to other entities. These other entities may be customers of the entity operating the system 304. An end user of such a customer can thus operate the system 302 to access the web service provided by the system 304 to request and receive domain-specific images 320 for the particular domain 316 to which the user wishes to tailor the OCR machine learning model 322. The system 302 may be considered a user computing device in this respect.

Along with the domain-specific images 320, the system 304 may generate and transmit a ground truth file 324 and a mapping file 326 to the system 302. The ground truth file 324 may be a json-format file, for instance, whereas the mapping file 326 may be a text file. The ground truth file 324 specifies the word (i.e., n-gram) included in each domain-specific image 320. The mapping file 326 specifies the word included in each image 320, as well as the rendering parameters used to generate that image 320. For example, the mapping file 326 may specify the font-background-filter combination used to generate each image 320.

The system 302 may divide the domain-specific images 320 into a set of training images, a set of testing images, and a set of validation images. The system 302 can use the ground truth file 324 along with the training and testing images to train the OCR machine learning model 322. For example, during the training process, the system 302 may iteratively refine parameters of the model 322 based on the training images until the model 322 has a specified accuracy as to the testing images. The system 302 references the ground truth file 324 during the training process in order to identify the word (i.e., n-gram) of each training and testing image.

The system 302 can then use the mapping file 326 along with the validation images to validate the resultantly trained OCR machine learning model 322. The system 302 may identify which validation images the machine learning model 322 predicted the correct word (i.e., n-gram) for and which images the model 322 predicted the wrong word for. The system 302 can then reference the mapping file 324 to identify if there are particular rendering parameters or combinations thereof for which the model 322 has reduced accuracy. For example, the model 322 may have reduced accuracy for images in which the words are rendered at small font sizes.

The difference between the testing images and the validation images is that the testing images are used during iterative training of the OCR machine learning model 322, whereas the validation images are used once the model 322 has been trained. By identifying types of images (e.g., particular rendering parameters or combinations thereof) for which the model 322 has reduced accuracy, validation can inform the kinds of additional domain-specific images 320 that should be obtained to improve the model 322. Once such additional images 320 have been acquired, the model 322 can then be retrained using these images 320.

Figure 4A:
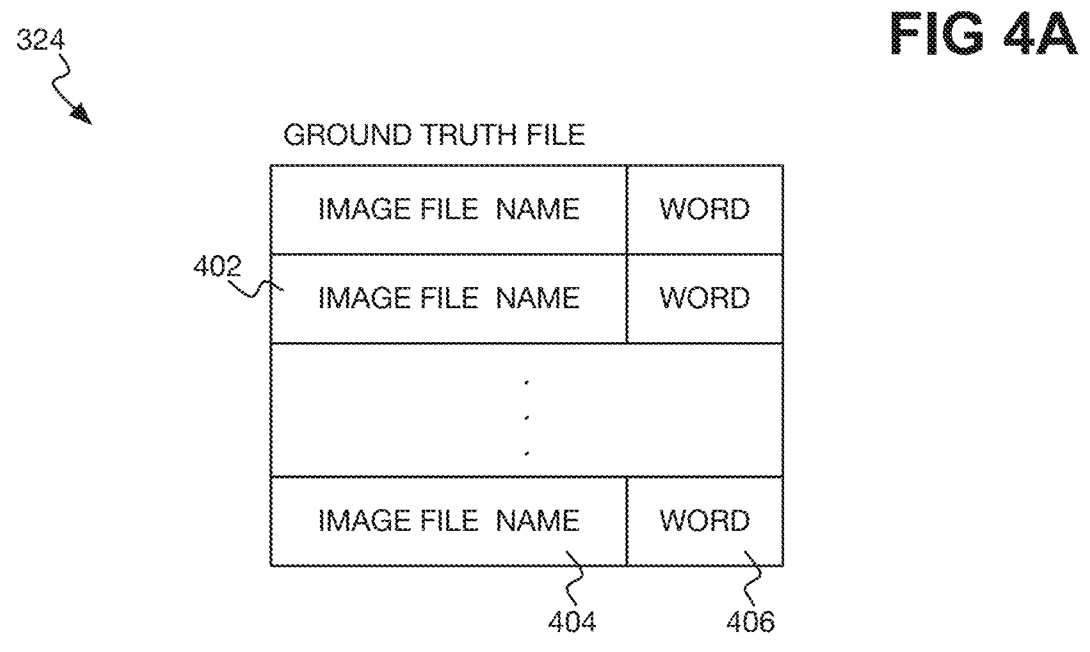
FIGS. 4A and 4B are diagrams of an example ground truth file and an example mapping file, respectively, which can be generated along with domain-specific images and used for training and validation of an OCR machine learning model.
Figure 4B:
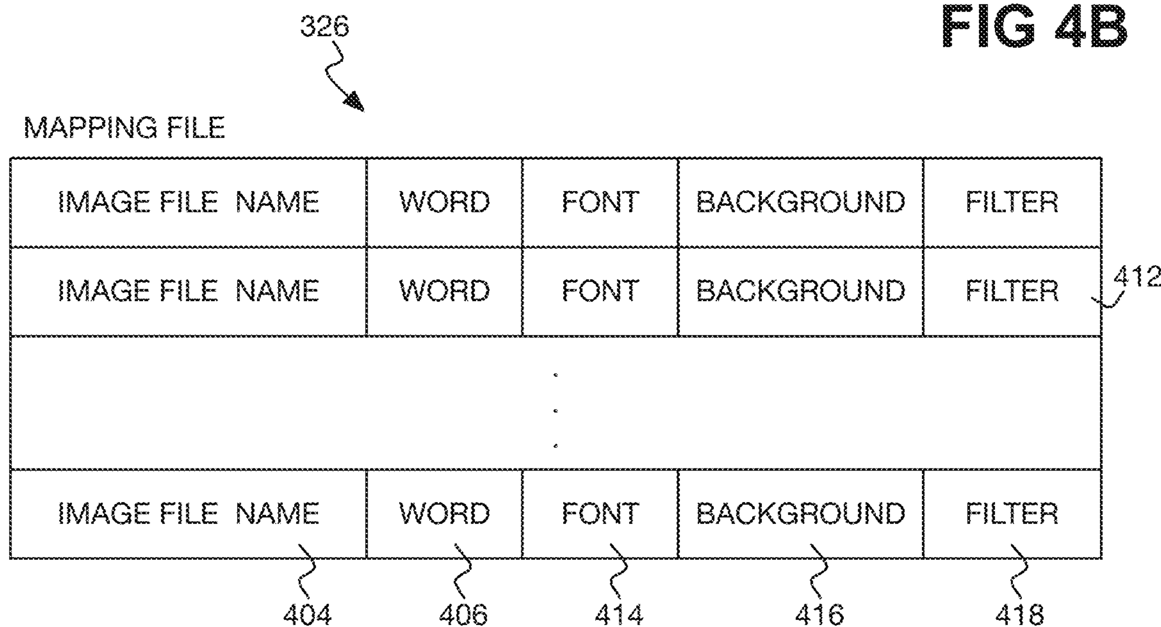

FIGS. 4A and 4B respectively show an example ground truth file 324 and an example mapping file 326. The ground truth file 324 includes a number of entries 402 corresponding to the domain-specific images 320. Each entry 402 specifies its corresponding image 320 by image file name 404, and specifies the word 406 (i.e., n-gram) included in the image 320. For training of the OCR machine learning model 322, the word 406 in each domain-specific image 320 has to be known, and the ground truth file 324 is referenced during training to retrieve this information.

The mapping file 326 also includes a number of entries 412 corresponding to the domain-specific images 320. Each entry 412 of the mapping file 326 specifies its corresponding image 320 by image file name 404, and specifies the word 406 (i.e., n-gram) included in the image 320, as with the entries 402 of the ground truth file 324. However, each entry 412 of the mapping file 326 also specifies the rendering parameter values used to render the word 406 in its corresponding image 320. In the depicted example, each entry 412 specifies the font 414 (e.g., font name, font style, and font size), image background 416, and applied filter 418 in this respect.

This additional information contained in the mapping file 326 is not needed during training of the OCR machine learning model 322. That is, the particular rendering parameters used to render the word 406 (i.e., n-gram) in a corresponding image 320 is not needed for training the model 322. However, once the model 322 has been trained, the additional information contained in the mapping file 326 is useful during validation, to identify rendering parameters or combinations thereof for which the trained model 322 has reduced accuracy.

FIGS. 5A, 5B, and 5C show an example method 500A, 500B, and 500C for generating domain-specific images 320 and for training and validating an OCR machine learning model 322 within the environment 300. The OCR machine learning model-generating system 302 performs the parts of the method 500A, 500B, and 500C in the left-hand columns, and the domain-specific image-generating system 304 performs the parts in the right-hand columns. Each of the systems 302 and 304 may, for instance, include a processor and a computer-readable data storage medium storing program code executable by the processor to perform its respective method parts. (However, as also noted above, the systems 302 and 304 may be implemented as a single system, such as a single computing device.)

Referring to FIG. 5A, the system 304 transmits to the system 302 over the network 306 the domains 310 for which the database 308 stores URL addresses 312 of web pages (502). The system 302 thus receives the domains 310 (504). The system 302 can receive user specification of the particular domain 316 from the domains 310 (506). For instance, the system 302 may display the domains 310, and receive user selection of the particular domain 316 from the displayed domains 310.

The system 302 may also receive user specification of a relevance threshold to use to determine domain-relevant words (i.e., n-grams) (508), as well as user specification of the rendering parameters to use to render domain-specific images 320 for each such word (510). The system 302 transmits the particular domain 316, the relevance threshold, and the rendering parameters to the system 304 over the network 306 (512).

The system 304 therefore receives the particular domain 316, the relevance threshold, and the rendering parameters (514). The system 304 retrieves the URL addresses 312 for the web pages associated with the particular domain 316 from the database 308 (516). The system 304 can then generate the domain-specific images 320 for the particular domain 316 as per the method 100.

Referring to FIG. 5B, therefore, the system 304 determines the words in the web pages associated with the particular domain 316 (518), and identifies domain-specific words (i.e., n-grams) for the particular domain 316 based on the words in these web pages (520). In identifying the domain-specific words, the system 304 can use the user-specified relevance threshold. The system 304 generates corresponding domain-specific images for each domain-specific word (i.e., n-gram) in accordance with the user-specified parameters (522), and can also generate the ground truth file 324 and the mapping file 326 (524).

The system 304 transmits the domain-specific images 320, the ground truth file 324, and the mapping file 326 over the network 306 to the system 302 (526), which thus receives the images 320 and the files 324 and 326 (528). The system 304 may divide the domain-specific images 320 into training images, testing images, and validation images (530). The system 304 can train the OCR machine learning model 322 using the training and testing images and the ground truth file 324 (532). The system 304 can then validate the resultantly trained OCR machine learning model 322 using the validation images and the mapping file 326 (534).

Referring to FIG. 5C, the system 304 may, for instance, identify problematic words (i.e., n-grams) based on the validation of the OCR machine learning model 322 (536). The words rendered in the validation images that the model 322 incorrectly transcribed in more than a threshold percentage of cases may be identified as problematic words in this respect. For example, there may be 72 images of each domain-relevant word. If the model 322 did not predict the correct word in more than a threshold percentage of these images for a given domain-relevant word, the word in question may be identified as problematic. As such, more training data may be needed so that the word is more accurately identified.

Similarly, the system 302 may identify problematic rendering parameters (including combinations thereof) based on the validation of the OCR machine learning model 322 (538). The rendering parameters or combinations thereof used to render images that the model 322 did not predict the correct word for in more than a threshold percentage of cases may be identified as problematic. For example, if the model 322 did not predict the correct word in more than a threshold percentage of images rendering using a particular font-background-filter combination, then this combination may be identified as problematic.

The system 302 may transmit the problematic words (i.e., n-grams) and the problematic rendering parameters (including combinations thereof) over the network 306 to the system 304 (540), which receives this information (542). For each problematic word, the system 304 may generate additional domain-specific images 320 using different rendering combinations than those originally used (544). The system 304 may also generate additional images 320 for each problematic rendering parameter (or combination of parameters) (546). The words rendered in such additional images 320 generated in (546) may be words of the web pages associated with the particular domain 316 that had lower relevance scores and therefore not originally selected as domain-relevant words.

Processing may then proceed back to (524) of FIG. 5B. As such, a new or updated ground truth file 324 and mapping file 326 can be generated that reference the additional domain-specific images 320, and the OCR machine learning model 322 retrained using the additional images 320. Once validation has not identified any or few problematic words (i.e., n-grams) and rendering parameters (including combinations thereof), the model 322 may then be used in a production environment in which, for instance, user-captured images of text in the particular domain 316 are transcribed using the model 322.

Figure 6:
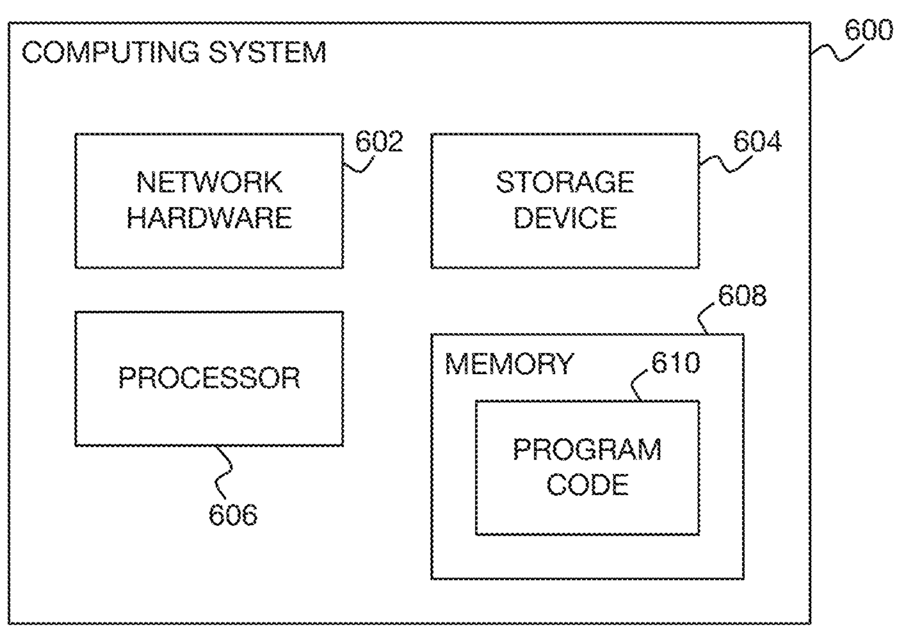
FIG. 6 is a diagram of an example computing system.

FIG. 6 shows an example computing system 600. Each of the OCR machine learning model-generating system 302 and the domain-specific image-generating system 304 can be implemented as an instance of the computing system 600. Each instance of the computing system 600 can be or include one or more computing devices, such as desktop, laptop, notebook, and server computing devices, as well as other computing devices like smartphones, tablet computing devices, and so on. The computing system 600 includes at least network hardware 602, a storage device 604, a processor 606, and memory 608.

The network hardware 602 may also be referred to as a network circuit, and permits the computing system 600 to connect to another computing device or system over the network 306. The storage device 604 may be a non-volatile computer-readable data storage medium, such as an SSD, HDD, or flash memory. In the case in which the system 600 implements the system 302, the storage device 604 may store the OCR machine learning model 322. In the case in which the system 600 implements the system 304, the storage device 604 can store the database 308.

The memory 608 may be a volatile or non-volatile computer-readable data storage medium, and stores program code 610. In the case in which the computing system 600 implements the system 302, execution of the program code 610 by the processor 606 results in performance of the parts of the method 500A, 500B, 500C in the left-hand columns of FIGS. 5A, 5B, and 5C. In the case in which the computing system 600 implements the system 304, execution of the program code 610 by the processor 606 results in performance of the method parts in the right-hand columns.

Techniques have been described for generating domain-specific images 320 of domain-relevant words (i.e., n-grams) for a particular domain 316. Training an OCR machine learning model 322 using the domain-specific images 320 improves OCR of scanned or captured images of documents related to the particular domain 316 using the model 322. Validating the model 322 using the domain-specific images 320 permits identification of which image characteristics (e.g., rendering parameters including combinations thereof) for which the model 322 has decreased accuracy, which can then be improved by further training.

We claim:

1. A method for generating domain-specific images used at least for training an optical character recognition (OCR) machine learning model, the method comprising:

retrieving, by a processor, universal resource locator (URL) addresses of web pages associated with a particular domain;

determining, by the processor, a plurality of words in the web pages associated with the particular domain;

identifying, by the processor, domain-relevant n-grams of the words for the particular domain;

generating, by the processor, corresponding domain-specific images of each domain-relevant n gram for the particular domain; and generating a ground truth file having a plurality of entries that each specify one of the domain-specific images and the domain-relevant n-gram to which the one of the domain-specific images corresponds.

2. The method of claim 1, wherein training the OCR machine learning model using the corresponding domain-specific images generated for each domain-relevant n-gram improves OCR of scanned or captured images of documents related to the particular domain using the OCR machine learning model.

3. The method of claim 1, wherein n is equal to one, such that each domain-relevant n-gram is one of the words.

4. The method of claim 1, wherein determining the plurality of words in the web pages associated with the particular domain comprises:

retrieving a plurality of words of a web page at each URL address by individually traversing the web pages at the URL addresses, to assemble a global list of words that each appear in one or more of the web pages; and removing, from the global list of words, any word having a length less than a threshold length.

5. The method of claim 1, wherein identifying which of the words are domain-relevant words for the particular domain comprises:

applying a classifier model to the words to generate a plurality of n-grams that each have a relevance score to the words as a whole; and determining which of the generated plurality of n-grams are the domain-relevant n-grams based on the relevance score of each n-gram.

6. The method of claim 5, wherein determining which of the generated plurality of n-grams are the domain-relevant n-grams based on the relevance score of each n-gram comprises:

selecting a specified percentage of the generated plurality of n-grams for which the relevance score is highest as the domain-relevant n-grams.

7. The method of claim 1, wherein the corresponding domain-specific images of each domain-relevant n-gram for the particular domain are generated according to a plurality of rendering parameters comprising:

a font parameter specifying one or more fonts by font type, font style, and/or font size;

a background parameter specifying one or more image backgrounds; and a filter parameter specifying one or more filters.

8. A non-transitory computer-readable data storage medium storing program code executable by a computing device to perform processing for generating domain-specific images used at least for training an optical character recognition (OCR) machine learning model, the processing comprising:

receiving, from a user computing device a network, user specification of a particular domain for which the domain-specific images are to be generated;

retrieving universal resource locator (URL) addresses of web pages associated with the particular domain from a database;

determining a plurality of words in the web pages associated with the particular domain by individually traversing the web pages at the URL addresses thereof;

identifying domain-relevant n-grams of the words for the particular domain;

generating corresponding domain-specific images of each domain-relevant n-gram for the particular domain;

generating a ground truth file having a plurality of entries that each specify one of the domain-specific images and the domain-relevant n-gram to which the one of the domain-specific images corresponds; and transmitting, to the user computing device over the network, the ground truth file and the domain-specific images that have been generated for the particular domain.

9. The non-transitory computer-readable data storage medium of claim 8, wherein training the OCR machine learning model using the ground truth file and the corresponding domain-specific images generated for each domain-relevant n-gram improves OCR of scanned or captured images of documents related to the particular domain using the OCR machine learning model.

10. The non-transitory computer-readable data storage medium of claim 8, wherein n is equal to one, such that each domain-relevant n-gram is one of the words.

11. The non-transitory computer-readable data storage medium of claim 8, wherein the processing further comprises:

transmitting, to the user computing device over the network, a plurality of different domains that for each of which the database stores domain-associated web pages by URL address, wherein receiving the user specification of the particular domain comprises receiving user selection of the particular domain from the different domains.

12. The non-transitory computer-readable data storage medium of claim 8, wherein determining the plurality of words in the web pages associated with the particular domain comprises:

for each URL address, traversing a web page at the URL address to retrieve text of the web page, and adding a list of words in order of appearance in the text to a global ordered list of words; and removing, from the global ordered list of words, every word having a length less than a threshold length.

13. The non-transitory computer-readable data storage medium of claim 12, wherein the processing further comprises receiving, from the user computing device over the network, user specification of a relevance threshold, and wherein identifying which of the words are domain-relevant words for the particular domain comprises:

providing the global ordered list as input to a classifier model;

receiving as output from the classifier model a plurality of n grams and a relevance score of each n-gram to the global ordered list; and determining which of the received plurality of n-grams are the domain-relevant n-grams based on the relevance score of each n-gram and the relevance threshold.

14. The non-transitory computer-readable data storage medium of claim 13, wherein the relevance threshold comprises a percentage, and wherein determining which of the received plurality of n-grams are the domain-relevant n-grams based on the relevance score of each n-gram comprises:

selecting the percentage of the received plurality of n-grams for which the relevance score is highest as the domain-relevant n-grams.

15. The non-transitory computer-readable data storage medium of claim 8, wherein the processing further comprises receiving, from the user computing device over the network, user specification of a plurality of rendering parameters comprising:

a font parameter specifying one or more fonts by font type, font style, and/or font size;

a background parameter specifying one or more image backgrounds; and a filter parameter specifying one or more filters, wherein the corresponding domain-specific images of each domain-relevant n gram for the particular domain are respectively generated according to a plurality of font-background-filter combinations that each include one of the fonts, one of the image backgrounds, and one of the filters.

16. The non-transitory computer-readable data storage medium of claim 15, wherein the processing further comprises:

generating a mapping file having a plurality of entries that each specify one of the domain-specific images, the domain-relevant n-gram to which the one of the domain-specific images corresponds, and a font-background-filter parameter combination according to which the one of the domain-specific images has been generated; and transmitting the mapping file to the user computing device over the network.

17. The non-transitory computer-readable data storage medium of claim 16, wherein validating the OCR machine learning model using the mapping file and the corresponding domain-specific images generated for each domain-relevant n-gram permits identification of which of the fonts, which of the one or more backgrounds, and which of the filters for which the OCR machine learning model has decreased accuracy, such that accuracy of the OCR machine learning model is improved upon further training of the OCR machine learning model.

18. A computing system for generating domain-specific images used at least for training an optical character recognition (OCR) machine learning model, the computing system comprising:

network hardware to communicatively connect to a user computing device over a network;

a storage device storing a database of a plurality of universal resource locator (URL) addresses of web pages for each of a plurality of domains;

a processor; and a memory storing program code executable by the processor to:

receive, from the user computing device over the network, user specification of a particular domain of the plurality of domains for which the domain-specific images are to be generated, user specification of a relevance threshold, and user specification of a plurality of rendering parameters;

retrieve the URL addresses of the web pages stored in the database for the particular domain;

determine a plurality of words in the web pages for the particular domain by individually traversing the web pages at the URL addresses thereof;

applying a classifier model to the words to generate a plurality of n-grams that each have a relevance score to the words as a whole;

determine which of the generated plurality of n-grams are domain-relevant n-grams based on the relevance score of each n-gram and the relevance threshold;

generate corresponding domain-specific images of each domain-relevant n-gram for the particular domain according to the rendering parameters; and transmitting, to the user computing device over the network, the domain-specific images that have been generated for the particular domain.

19. The computing system of claim 18, wherein the program code is executable by the processor to further:

generating a ground truth file having a plurality of ground truth entries that each specify one of the domain-specific images and the domain-relevant n-gram to which the one of the domain-specific images corresponds;

generate a mapping file having a plurality of mapping entries that each specify one of the domain-specific images, the domain-relevant n-gram to which the one of the domain-specific images corresponds, and a plurality of image characteristics that the one of the domain-specific images has been generated to have; and transmit the ground truth file and the mapping file to the user computing device over the network, wherein training the OCR machine learning model using the ground truth file and the corresponding domain-specific images generated for each domain-relevant n-gram improves OCR of scanned or captured images of documents related to the particular domain using the OCR machine learning model, and wherein validating the OCR machine learning model using the mapping file and the corresponding domain-specific images generated for each domain-relevant n gram permits identification of the image characteristics for which the OCR machine learning model has decreased accuracy, such that accuracy of the OCR machine learning model is improved upon further training of the OCR machine learning model.

* * * * *